United States Patent

[11] 3,532,147

[72] Inventors Vernon E. Gough;
 Glyn B. Roberts; Thomas Holmes, Sutton
 Coldfield, England
[21] Appl. No. 717,830
[22] Filed Apr. 1, 1968
[45] Patented Oct. 6, 1970
[73] Assignee The Dunlop Company Limited,
 London, England,
 a British Company
[32] Priority Apr. 8, 1967
[33] Great Britain
[31] 16,197/67

[54] PNEUMATIC TIRES
 25 Claims, 15 Drawing Figs.
[52] U.S. Cl. .................................... 152/209,
 244/103
[51] Int. Cl. ..................................... B60c 11/10
[50] Field of Search .......................... 152/209;
 244/103

[56] References Cited
UNITED STATES PATENTS

| 2,403,309 | 7/1946 | Smith | 152/209 |
| 2,487,398 | 11/1949 | Thompson | 152/209 |
| 2,575,439 | 11/1951 | Billingsley | 152/209 |

FOREIGN PATENTS

| 1,317,964 | 1/1963 | France | 152/209 |
| 751,641 | 7/1956 | Great Britain | 152/209 |
| 20,442 | 3/1929 | Netherlands | 152/209 |

Primary Examiner—James B. Marbert
Attorney—Stevens, Davis, Miller & Mosher

ABSTRACT: A pneumatic aircraft tire provided with means to facilitate the landing and take-off of an aircraft and overcome the phenomenon known as "aquaplaning" by converting some of the kinetic energy of the moving aircraft when the tire carried by the aircraft contacts the water on the runway in the path of the tire into rotational energy of the tire, the said means comprising a plurality of recesses in the ground-contacting surface of the tire each of the recesses accomodating a face upon which water may impinge, and water outlet means associated with each recess, of which the following is a specification.

Patented Oct. 6, 1970 3,532,147
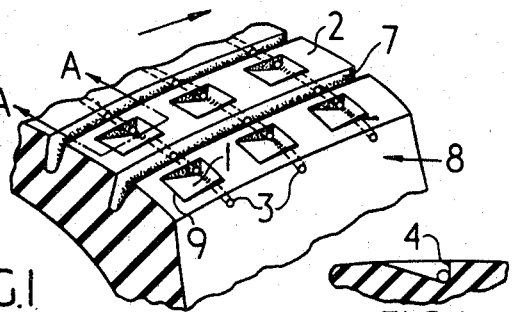
FIG.1
FIG.1A
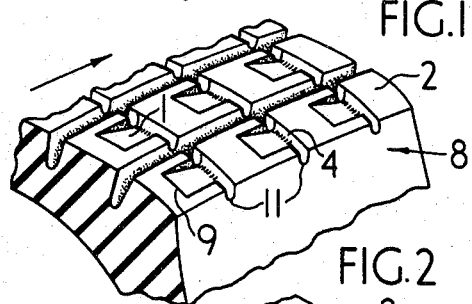
FIG.2
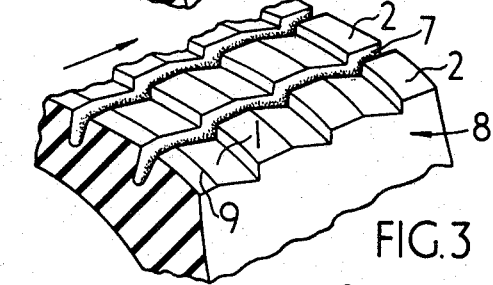
FIG.3
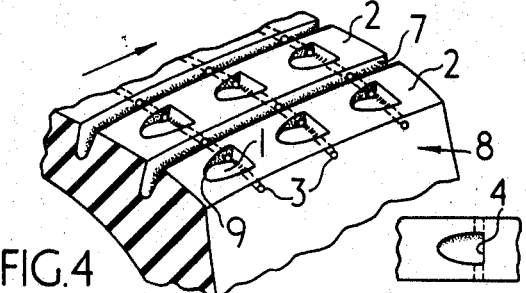
FIG.4
FIG.4A

PNEUMATIC TIRES

This invention relates to pneumatic tires.

When, during the landing of an aircraft, wet conditions are experienced on the runway, for example, pools of water, there is a tendency for the aircraft tires to aquaplane over the water surface, at which time rotation of the tire either ceases or cannot be built up to the speed required safely to land the aircraft and to enable safe braking to take place.

It has been found that the above-mentioned difficulties may be avoided by converting some of the kinetic energy of the moving aircraft when the tire carried by the aircraft contacts the runway water into rotational energy of the tire. The provision of a tire construction that will harness some at least of the said kinetic energy forms an object of the present invention.

According to the present invention there is provided a pneumatic tire comprising a ground-contacting tread portion provided with a plurality of water-receiving recesses each having at least one face to be engaged by water standing on a surface over which the tire is to run and water outlet means associated with some at least of the recesses to promote the flow of water through the recesses and against said faces to effect a hydro-dynamic action which tends to reduce the relative speed of the ground-contacting portion with respect to the said water covered surface during slipping of the tire upon said surface.

Preferably the tread portion of the tire is also provided with a plurality of generally circumferentially-extending ribs having a generally circumferentially-extending groove at each side thereof (with the exception of the shoulder ribs which are not formed with an adjacent groove on the axially outer face of the tire shoulder region).

Preferably each water-receiving recess tapers in depth, from the ground-contacting surface of the rib portion wherein the water enters, to the maximum depth of the recess, where it is formed with a substantially radially extending face or end wall, and the taper may be, for example, within the range of 1:3 to 1:6.

In addition, the entry portion of the water-receiving recesses when viewed in plan may be square or they may be tapered to provide a nose portion. Thus a tear drop shape may be utilized for the overall plan profile, the "lead in" for the water being at the narrow end.

Alternatively the water-receiving recesses may not taper in depth, e.g. the recesses may comprise cylindrical or cubic holes in the ground-contacting surface of the tread, this construction relying on the substantially high hydro-dynamic pressure of the wedge of water immediately in front of the ground-contacting area of the tire to cause the water to flow into the said holes.

The faces of the water-receiving recesses may be plane or concave.

Preferably the water-receiving recesses are less wide than the width of the rib in which they are located.

Alternatively, the recess extends across the full axial width of at least one of the ribs, and in this case the water outlet means comprises wholly or partly the axially outer end portions of each recess which open into either the groove at each end, or a groove at one end and the axially outer face of the tire shoulder region at the other end as the case may be.

The recesses may be less than, the same as, or deeper than the normal pattern depth of the tire though remoulding or retreading considerations may make it desirable only slightly to exceed the normal pattern depth by, for example, 1 mm.

The water outlet means may comprise outlet conduits disposed radially inwardly of the ground-contacting surface of the unworn tire.

Alternatively, the water outlet means may comprise grooves formed in the ground-contacting surface of the tire.

The outlet conduits or grooves may be circumferential, transverse, inclined with or against the normal direction of rotation of the tire and/or inclined radially.

The outlet conduits or grooves may extend transversely into a circumferential groove and/or to a shoulder, or the outlet conduits or grooves may, separately, or in addition to the dispositions described, extend from one recess to the next, e.g. circumferentially, being positioned to convey water from the face of one of the recesses into the adjacent recess and against the face of this recess.

The invention will now be described in more detail with reference to the accompanying drawings wherein:

FIG. 1 illustrates a first embodiment of the invention;

FIG. 1A is a circumferential section through a recess according to the first embodiment of the invention along line A-A;

FIGS. 2 and 3 illustrate modifications of the first embodiment;

FIG. 4 illustrates a second embodiment of the invention;

FIG. 4A is a plan view of a recess according to the second embodiment of the invention;

Figures 5, 5A:
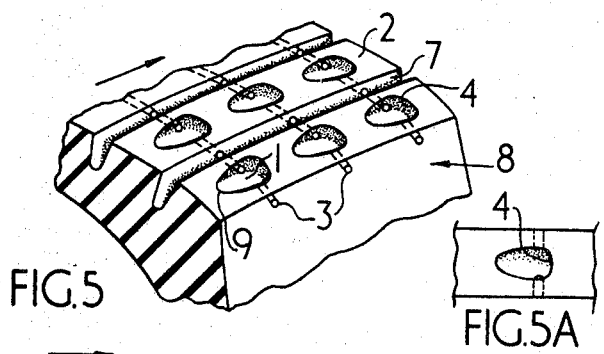
FIG. 5 illustrates a modification of the second embodiment of the invention.
FIG. 5A is a plan view of a recess illustrated in FIG. 5.

In a first embodiment of the invention shown in FIGS. 1 and 1A, an aircraft tire is provided with a plurality of water-receiving recesses 1 disposed around the periphery of circumferential ribs 2 moulded into the ground-contacting surface of the tire. Each recess 1 is of square shape when viewed in plan, and tapers in depth from the ground-contacting surface of the rib portion wherein the water enters, to the maximum depth of the recess 1, where it is formed with a substantially radially extending plane face 4 or end wall against which the water impinges to provide a hydro-dynamic impulse to the tire.

The recesses 1 are disposed symmetrically on the mid-circumferential line of each rib and the axial width of each recess is substantially less than that of the rib on which it is disposed.

Each recess 1 is provided with a pair of water outlet conduits 3 disposed radially inwardly of the ground-contacting surface of the unworn tire, and extending substantially axially one on each side of the recess, each water outlet conduit 3 communicating with a circumferential groove 7 or a shoulder 8.

In a first modification of the first embodiment, shown in FIG. 2, the water outlet means provided for each recess comprise a pair of grooves 11, extending axially, each groove 11 communicating with either a circumferential groove 7 or a shoulder 8.

In a second modification of the first embodiment of the invention, as shown in FIG. 3, each recess extends across the full axial width of each rib 2, and the water outlet means comprise the outer end portions of each recess 1 which open into either a circumferential groove 7 at each end, or a groove 7 at one end and the axially outer face of the tire shoulder region 8 at the other end.

In a second embodiment of the invention, shown in FIGS. 4 and 4A, an aircraft tire is provided with a plurality of water-receiving recesses 1 disposed around the periphery of circumferential ribs moulded into the ground-contacting surface of the tire. Each recess 1 is of substantially parabolic form when viewed in plan, and tapers in depth from the ground-contacting surface of the rib portion corresponding to the nose portion 9 of the recess 1, wherein the water enters to the maximum depth of the recess, where it is formed with a substantially radially extending plane face 4 or end wall against which the water impinges to provide a hydro-dynamic impulse to the tire.

The recesses are disposed symmetrically on the mid-circumferential line of each rib 2, and the maximum axial width of each recess is substantially less than that of the rib on which it is disposed.

The recesses 1 in each rib 2 are symmetrically disposed circumferentially about that rib.

Each recess 1 is provided with a pair of water outlet conduits 3 disposed radially inwardly of the ground-contacting surface of the unworn tire, extending substantially axially one on each side of the recess 1, each water outlet conduit 3 communicating with a circumferential groove 7 on the axially outer face of a tire shoulder region 8.

In a first modification of the second embodiment of the invention shown in FIG. 5 each recess is provided with a concave face 4 opposite the nose portion 9 upon which the water impinges.

Figures 6, 7A, 7B:
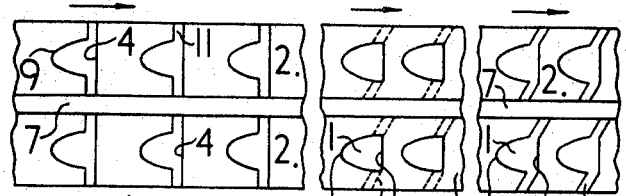
FIGS. 6, 7A, 7B and 8 illustrate further modifications of the second embodiment.

In a second modification of the second embodiment of the invention shown in FIG. 6 the water outlet means of each recess 1 comprises a pair of axially extending grooves 11, one on each side of the recesses 1, each groove 11 communicating with a circumferential groove 7 or a shoulder 8.

In one form of the first or second modification of the second embodiment of the invention shown in FIG. 7A and 7B the water outlet means, i.e. the pair of water outlet conduits 3 shown in FIG. 7A or the pair of grooves 11 shown in FIG. 7B, associated with each recess 1 are inclined to a circumferential line of the tire and the water outlet means of adjacent recesses of the tire are substantially parallel.

In this configuration of the water outlet means, the tire is able to function in a similar manner to a turbine, the water outlet means corresponding to the vanes of the turbine. Some at least of the water entering the circumferential grooves will tend to flow down the inclined water outlet conduits or grooves facing the oncoming water. The water will flow down the water outlet conduits or grooves, against the face of the recesses and out through the opposite water outlet conduits or grooves associated with each recess and into the next circumferential groove. In this fashion, some of the water tends to flow transversely across the tread pattern in the manner of a fluid passing through a turbine, and rotational movement is imparted to the tire.

Figures 8, 9:
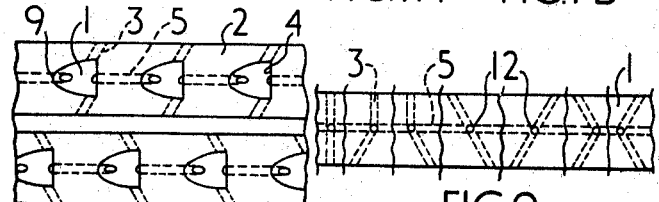
FIG. 9 illustrates several further embodiments of the invention.

FIG. 8 modifies the construction shown in FIGS. 7A and 7B in that recesses 1 are in addition each provided with a tunnel 5 extending circumferentially interconnecting each recess 1 and its neighbors.

Several further embodiments of the invention are shown in the composite view illustrated by FIG. 9, an aircraft tire being provided with a plurality of radially extending water-receiving holes 12 disposed around the periphery of the circumferential ribs 2 moulded into the ground-contacting surface of the tire. Each hole or recess 12 is of circular shape when viewed in plan.

The holes 12 are disposed on the mid-circumferential line of each rib 2 and are symmetrically displaced circumferentially.

Each hole 12 is provided with a pair of water outlet conduits 3 disposed radially inwardly of the ground-contacting surface of the tire and each conduit 3 communicating with a circumferential groove 7 or a shoulder 8.

Acceptable inclinations of the conduits 3 with respect to an axial line are shown in the several parts of FIG. 9. It should be appreciated however that all of the conduit dispositions illustrated in FIG. 9 are not necessarily intended to be incorporated together in a single tire construction, but are presented in this fashion by way of example only, any one disposition, or several dispositions being utilisable in a single tire.

The holes 12 in any one rib 2 may be connected together circumferentially by means of circumferentially extending tunnels 5 or these may be dispensed with.

Figure 10A:
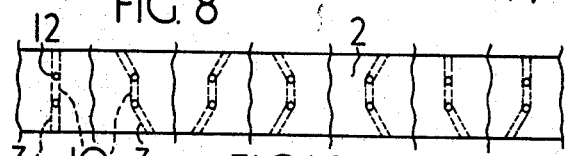
FIGS. 10A and 10B illustrate yet further modifications of the third embodiments of the invention.

In further modifications of the third embodiment, shown in FIG. 10A, the holes 12 are disposed on each rib 2 in pairs, each pair disposed in axial alignment on the rib 2 with respect to each other, and each pair disposed symmetrically about the mid-circumferential line of each rib.

Each hole 12 of each pair of holes is provided with one conduit 3 disposed radially inwardly of the ground-contacting surface of the tire and extending outwardly of the mid-circumferential plane of the rib in which the hole is located.

The holes of each pair of holes are interconnected by means of axially extending tunnels 10 one for each pair.

Figure 10B:
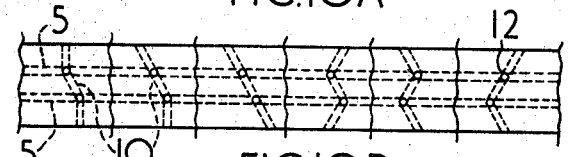

A variety of acceptable inclinations of the conduits with respect to an axial line are shown in FIG. 10A as is illustrated in FIG. 9 and for the same purpose and thus also applies to FIG. 10B wherein each hole 12 of each pair of holes is displaced circumferentially with respect to the other hole.

Each hole 12 of each pair of holes is connected to its immediate circumferentially located neighbors by means of circumferentially extending tunnels 5, one between each pair of circumferentially disposed immediate neighbors.

We claim:

1. A pneumatic tire comprising a ground-contacting tread portion a plurality of water-receiving recesses disposed in the ground-contacting tread portion, at least one face to be engaged by water standing on a surface over which the tire is to run incorporated in each of said recesses and water outlet means associated with some at least of the said recesses to promote the flow of water through the recesses and against said faces to effect a hydro-dynamic action which tends to reduce the relative speed of the ground-contacting tread portion of the tire with respect to the said water covered surface during slipping of the tire upon the said water covered surface.

2. A pneumatic tire according to claim 1 wherein the tire is provided with a plurality of generally circumferentially extending ribs and grooves.

3. A pneumatic tire according to claim 1 wherein each water-receiving recess tapers in depth from the ground-contacting surface of the rib portion wherein the water enters, to the maximum depth of the recess, where it is provided with a substantially radially extending face.

4. A pneumatic tire according to claim 3 wherein the said taper lies within the range of 1:3 to 1:6.

5. A pneumatic tire according to claim 1 wherein the entry portion of each of the water-receiving recesses is of square form when viewed in plan.

6. A pneumatic tire according to claim 1 wherein the entry portion of each water-receiving recess is tapered when viewed in plan, to provide a nose portion.

7. A pneumatic tire according to claim 1 wherein the face of each water-receiving recess, upon which the water standing on the surface over which the tire is to run impinges, is of plane form.

8. A pneumatic tire according to claim 6 wherein the said face is of concave form.

9. A pneumatic tire according to claim 1 wherein the water-receiving recesses comprise holes disposed in the rib portion of the tire.

10. A pneumatic tire according to claim 9 wherein the said holes lie in a circumferential plane of the tire and are inclined with respect to a radius of the tire.

11. A pneumatic tire according to claim 9 wherein the said holes lie in a circumferential plane and are radially disposed.

12. A pneumatic tire according to claim 9 wherein the said holes are of substantially cylindrical form.

13. A pneumatic tire according to claim 1 wherein the water-receiving recesses are less wide measured axially of the tire on the ground-contacting surface of the tire than the width of the rib in which they are located.

14. A pneumatic tire according to claim 1 wherein each recess extends across the full axial width of at least one of the ribs of the tire.

15. A pneumatic tire according to claim 1 wherein the depth of each recess is deeper than the pattern depth of the tire.

16. A pneumatic tire according to claim 1 wherein the water outlet means comprises water outlet conduits disposed radially inwardly of the ground-contacting surface of the unworn tire.

17. A pneumatic tire according to claim 1 wherein the water outlet means comprises water outlet grooves.

18. A pneumatic tire according to claim 1 wherein the water outlet means are transversely disposed with respect to the normal direction of rotation of the tire.

19. A pneumatic tire according to claim 1 wherein the water outlet means are inclined to a line parallel to the axis of the tire.

20. A pneumatic tire according to claim 1 wherein the water outlet means extend circumferentially of the tire.

21. A pneumatic tire according to claim 1 wherein the water outlet means are inclined radially.

22. A pneumatic tire according to claim 1 wherein the water outlet means interconnects each recess and a circumferentially extending groove.

23. A pneumatic tire according to claim 1 wherein the water outlet means interconnect at least some of the recesses and a shoulder of the tire.

24. A pneumatic tire in which the water outlet means interconnect at least some of the recesses of the tire.

25. A pneumatic tire comprising a ground-contacting tread portion, at least one circumferentially extending groove, a plurality of water-receiving recesses disposed in the ground-contacting tread portion, and water outlet means to permit flow of water from the recesses away from the ground-contacting portion of the tread, said water outlet means consisting of conduits disposed radially inwardly of the ground-contacting surface of the unworn tire, the recesses having an asymmetric shape in longitudinal section, each recess being of increasing depth and ending in a wall forming a face to be engaged by water standing on a surface over which the tire is run and the water outlet means from each recess leading away from said face whereby flow of water against said faces is promoted to effect a hydrodynamic action which tends to reduce the relative speed of the ground-contacting tread portion of the tire with respect to the water covered surface during slipping of the tire upon said water covered surface.